(12) United States Patent
Vogel et al.

(10) Patent No.: US 12,163,785 B2
(45) Date of Patent: Dec. 10, 2024

(54) OPTICAL SURVEYING INSTRUMENT WITH MOVABLE MIRROR

(71) Applicant: Trimble Jena GmbH, Jena (DE)

(72) Inventors: Michael Vogel, Schleifreisen (DE); Andreas Frank, Elgersburg (DE)

(73) Assignee: Trimble Jena GmbH, Jena (DE)

( * ) Notice: Subject to any disclaimer, the term of this patent is extended or adjusted under 35 U.S.C. 154(b) by 946 days.

(21) Appl. No.: 17/197,642

(22) Filed: Mar. 10, 2021

(65) Prior Publication Data

US 2021/0285766 A1    Sep. 16, 2021

(30) Foreign Application Priority Data

Mar. 10, 2020 (EP) .................................... 20162053

(51) Int. Cl.
    *G01C 15/00* (2006.01)
(52) U.S. Cl.
    CPC .................................. *G01C 15/002* (2013.01)
(58) Field of Classification Search
    None
    See application file for complete search history.

(56) References Cited

U.S. PATENT DOCUMENTS

| 2007/0180716 | A1  | 8/2007  | Hertzman |
| 2014/0307252 | A1  | 10/2014 | Hinderling et al. |
| 2016/0025491 | A1  | 1/2016  | Kotzur et al. |
| 2016/0209500 | A1  | 7/2016  | Markendorf |
| 2020/0025929 | A1* | 1/2020  | Kirillov ................ G01S 7/4865 |
| 2020/0256960 | A1* | 8/2020  | LaChapelle ........... G01S 7/4863 |
| 2020/0386876 | A1* | 12/2020 | Kudla ................... G01S 7/4865 |

* cited by examiner

*Primary Examiner* — Hovhannes Baghdasaryan
(74) *Attorney, Agent, or Firm* — Kilpatrick Townsend & Stockton LLP

(57) ABSTRACT

An optical surveying instrument is provided with an optical arrangement that includes at least one lens and the viewing element defining a viewing direction in the field of view. The distance measurement unit emits light beam towards the field of view and measured the distance to an object in the field of view based on a reflection of the light beam from the object. A movable mirror is arranged to direct the light beam towards the object and a mirror control unit is provided for reading calibration values from a calibration value memory and for moving the movable mirror using the calibration values to adjust the direction of the light beam to be aligned with the viewing direction.

16 Claims, 10 Drawing Sheets

OPTICAL SURVEYING INSTRUMENT WITH MOVABLE MIRROR

CROSS-REFERENCE TO RELATED APPLICATIONS

The present application claims priority to European Patent Application No. EP20162053.1, filed Mar. 10, 2020, the contents of which are incorporated herein by reference in their entirety for all purposes.

FIELD OF THE INVENTION

The present invention relates to optical surveying. More precisely, the present invention relates to optical surveying that includes a measurement of a distance to a surveyed object.

BACKGROUND

Optical surveying may include measurements of positions of one or multiple objects in the field, including angles, elevations and distances of the object or objects relative to an optical surveying instrument. In a typical application an optical unit of the optical surveying instrument is aimed at an object and the relative positional relation between the optical surveying instrument and the object is determined. If needed, based on a known position of the optical surveying instrument, a global position of the object may be obtained.

Optical surveying instruments may also be employed to track objects in the field, in which case a changing position of an object relative to the optical surveying instrument due to a movement of the object is tracked, generally by aiming the instrument to the object and by adjusting the orientation of the instrument to follow the object.

Optical surveying instruments generally include an optical arrangement such as a telescope to capture a scene including an object to be surveyed. The relative position of the object may be obtained by aiming the telescope of the optical instrument towards the object such that the object comes to lie on a viewing axis of the optical instrument. For example, the viewing axis may be defined by the telescope and a crosshair provided in an eyepiece of the instrument. A user may direct the telescope towards the object such that the object comes to lie on the crosshair. Subsequently, the orientation of the telescope, for example defined by the horizontal angle and vertical angles relative to reference angles may be obtained, and a distance to the object is measured using an electronic distance measurement device.

The electronic distance measurement device may include a light emitting element and a receiver that obtains a reflection of the light beam returning from the object. Based on the emitted light beam and its reflection a distance to the object can be measured. Optical surveying instruments usually are equipped with an integrated distance measurement unit that emits the light beam towards the object through the telescope, in which case the light beam is aligned with the viewing axis. However, it is also known to provide electronic distance measurement units that emit the light beam in parallel to the viewing axis of the telescope.

As the light beam usually has a relatively small footprint even in large distances from the surveying instrument, it is important that the emitted light beam is closely aligned with the viewing axis of the surveying instrument. Any misalignment may lead to the light beam being reflected or backscattered by other objects than the intended target in which case incorrect distances will be determined.

Usually, the precise alignment of the emitted light beam and the viewing axis, such as that the light beam coincides with the viewing axis or is precisely parallel thereto, is achieved by high precision manufacturing processes and by careful calibration of the surveying instrument during the manufacturing process. It is also known to calibrate the light beam at appropriate times during the life cycle of the optical surveying instrument to compensate for deviations between the light beam and the viewing axis that occur over time, for example due to improper handling of the surveying instrument or environmental influences such as changing temperature, humidity and similar.

The calibration involves a careful adjustment of elements of the optical surveying instrument that have an influence on the direction of the light beam. This may be a process that requires time and skill. The calibration of the light beam can be more difficult, if the light beam is not directly emitted from the distance measurement unit on the viewing axis but reflected by a mirror into the optical path of the telescope.

Producing optical surveying instruments with the required precision and/or calibration of the optical instrument for aligning the light beam with the viewing axis can be costly and may require time consuming testing and calibration.

SUMMARY

It is therefore an object of the invention to provide an optical surveying instrument with a distance measurement function that allows improving the alignment of the light beam emitted for the distance measurement with a viewing axis of the optical instrument in a cost-efficient manner and without requiring substantial amount of time for any calibration steps.

This object of the invention is solved by the subject matter of the independent claims. Advantageous embodiments of the invention are disclosed in the dependent claims.

DETAILED DESCRIPTION

Below embodiments of the invention will be described with respect to the figures. An embodiment of the invention is described below by making reference to FIG. 1.

Figure 1:
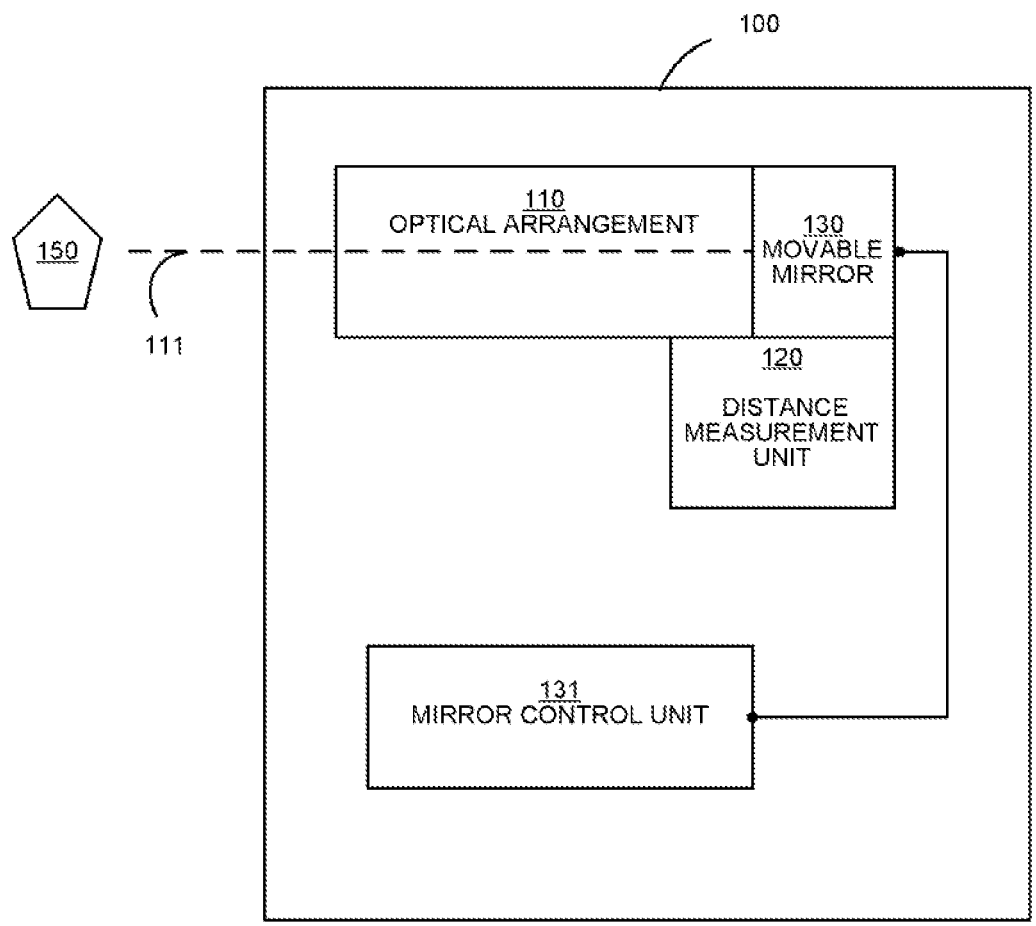
FIG. 1 illustrates an optical surveying instrument in accordance with an embodiment of the invention.

FIG. 1 schematically illustrates the layout of an optical surveying instrument 100, such as a surveying instrument that may employed in building or road construction.

The optical surveying instrument 100 includes an optical arrangement 110 including at least one lens and a viewing element defining a viewing axis 111 and a field of view.

A distance measurement unit 120 is provided for emitting a light beam towards the field of view and for measuring a distance to an object 150 located in the field of view, based on a reflection of the light beam from the object 150. The object may be a marker or equipped with a marker having specific reflecting properties or may be any other object present in the field without specific reflecting properties. The object may also be part of a larger object, such as a corner of a building, a position on a wall and similar.

The light beam may be a laser beam or any other kind of light beam, such as infrared light or light within any other wavelength range.

A movable mirror 130 is arranged to direct the light beam emitted from the distance measurement unit 120 towards the object 150. Moreover, a mirror control unit 131 is provided for reading calibration values from a calibration value memory and for moving the movable mirror using the calibration values to adjust the direction of the light beam to be aligned with the viewing axis. For example, the movable mirror may reflect the light beam from the distance measurement unit 120 such that the light beam essentially coincides with the viewing axis 111 or reflects the light beam such that the light beam progresses in parallel to the viewing axis 111.

The direction of the viewing axis 111 is defined by the optical elements of the optical arrangement and in the ideal case, i.e. if the viewing axis is perpendicular to the trunnion axis, may substantially constitute a centre line through the lens and through the viewing element of the optical arrangement. The centre of the viewing element may be marked by a crosshair or a predefined position on an imaging sensor, e.g. center position, so that an object in the scene captured by the optical arrangement that is on the crosshair when viewed through the viewing element or imaged on the predefined position on the imaging sensor lies on the viewing axis. The viewing axis 111 may also be termed line of sight, optical axis or viewing direction.

The optical surveying instrument 100 may for example be a theodolite that can be deployed in the field, such as on a construction site, using a tripod or any other suitable means to position the surveying instrument. Usually the entire optical surveying instrument 100 can be rotated around a vertical axis.

The optical arrangement 110 may be constituted by a telescope mounted to the optical surveying instrument so that it can be rotated around a horizontal axis. To direct the optical arrangement towards the target 150 generally the entire surveying instrument 100 will be suitably rotated around the vertical axis and the optical arrangement 110 is rotated around the horizontal axis so that the object 150 comes to lie on the viewing axis 111 defined by the optical arrangement.

The optical arrangement may be provided with a viewing element such as an eyepiece and a crosshair. In this case the crosshair and the at least one lens of the optical arrangement define the viewing axis. Typically, the viewing axis 111 leads through the centre of the least one lens and the crosshair. Alternatively, the viewing element may be constituted by an image sensor, in which case the viewing axis 111 is defined by a suitably selected position on the image sensor, such as a centre pixel of the image sensor and e.g. the centre of the at least one lens of the optical arrangement.

The distance measurement unit 120 may form an integral part of the surveying instrument or may be attached thereto. The distance measurement unit emits a light beam, for example a laser beam, towards the object 150 and receives light backscattered or reflected by the object 150. The distance between the surveying instrument and the object may then be determined by the time of flight between emission of the light and receiving the reflection. For example, the light may be emitted in short pulses and the time of flight to and from the object may be measured by a timer. Based on the time of flight and the speed of light the distance between the surveying instrument and the object can be determined. Alternatively, the phase shift of the reflected light beam relative to the emitted light beam may be used for distance measurement, alone or in combination with the time of flight measurement.

In one example the distance measurement unit is a laser distance measurement unit emitting a laser beam to the object 150 and receiving the reflected or backscattered laser beam from the object.

The movable mirror 130 is a mirror that is arranged to direct the light beam emitted from the distance measurement unit 120 through the optical arrangement 110 to the scene viewed with the optical arrangement and towards the object 150. Thus, the movable mirror may be provided in the path of the light beam from the distance measurement unit such that the light beam is reflected towards the object 150. If the light beam is made to coincide with the viewing axis 111, the movable mirror 130 may be centred on the viewing axis at an angle suitable to reflect the light beam on its way from the distance measurement unit along the viewing axis to the object and at the same time to let the image of the scene captured by the optical arrangement to reach the viewing element that may be arranged behind the mirror. The movable mirror may be a microelectromechanical MEMS mirror and the movement of the mirror may be controlled by control values that may be considered by control voltages suitable to rotate and/or move the reflective surface of the movable mirror into a desired inclination and/or position.

An arrangement of multiple reflecting elements such as beam splitters or coated elements for selectively passing light of specific wavelengths or in certain areas may alternatively be used in cooperation with the movable mirror 130 that is provided off the viewing axis, and that directs the light beam to a further reflecting element that is centred on the viewing axis.

The mirror control unit 131 is provided for obtaining calibration values from a calibration value memory and to apply them to the movable mirror so as to adjust the direction of the light beam to be aligned with the viewing axis. The mirror control unit 131 may be constituted by or may form part of a processing unit of the optical surveying instrument, adapted to obtain the control values from the control value memory and to apply the control values to the movable mirror. The control values may be determined beforehand during a calibration process during which the surveying instrument is calibrated. In this process control values of the movable mirror for adjusting its rotation around preferably two orthogonal rotational axes and/or a translational position may be adjusted such that the light beam emitted by the distance measurement unit 120 is aligned with the viewing axis.

If the light beam is in the visible wavelength range, and safe for the human eye, the alignment or calibration can be carried out by a user adjusting the control values such that the backscattered light of the light beam passes through the crosshair of an eyepiece or impinges on an image sensor at a predetermined position.

Otherwise, the alignment may be carried out by an alignment process using a target suitable for determining the position of the light beam. For example, a target with a surface having a pinhole may be scanned by scanning the target while moving the optical arrangement and thus the light beam in vertical and horizontal directions. Once the light beam passes through the hole in the target, the measured distances at the scan positions will significantly change, as the light beam now measures the distance to the backdrop of the target. This scanning of the target is preferably done in each of the two internal configurations of the surveying instrument, also termed faces of the surveying instrument, as known in the art. The first internal configuration, also termed the first face corresponds to a first internal configuration corresponding to a first rotational position of the optical arrangement around the viewing axis and the second face of the surveying instrument corresponds to a second internal configuration corresponding to a second rotational position of the optical arrangement around the viewing axis.

Based on the measurements in the two face orientations of the optical arrangement the deviation between the direction of the light beam and the viewing axis can be quantified and the control values for the movable mirror can be determined that are necessary to compensate for the deviation between the direction of the light beam and the viewing axis.

If a pinhole target is not available, it is also conceivable to perform a horizontal scan of a target constituted by a vertical edge and a vertical scan of a target constituted by a horizontal edge, such as a wall of a building or other structure. Once the measured distances at the scan positions significantly change, it is known that the light beam used for the measurement has passed the corresponding edge.

Alternatively, a collimator arrangement may be provided for measuring the axis errors of the surveying instrument and the directional errors of the light beam. Axis errors cover the deviation of orthogonality of the three axes of the instrument from each other, i.e. the two horizontal and the vertical axis. More precisely, the horizontal collimation error occurs in case the viewing axis is not perpendicular to the trunnion axis. The trunnion axis error occurs in case the trunnion axis is not perpendicular to the vertical axis of the instrument, which become more important for steep sightings. The vertical collimation error is constituted by an offset for the vertical angle only. Compensating this error ensures to obtain exactly a 100 gon vertical angle read-out for horizontal sightings.

The collimator may be provided in a base unit of the surveying instrument, the base unit holding an alidade rotatably linked to the base for a rotation around the vertical axis. The alidade holds the optical arrangement to be rotatable around the trunnion axis.

The base and alidade exhibit an optical channel for admitting the light beam to pass downwardly oriented, if the optical arrangement is provided in a vertical orientation with the viewing axis, directed vertically downward, i.e. into nadir.

The collimator may include a beam splitter arranged in the optical channel for at least partially directing the passing light beam through a collimator lens towards an image sensor of the collimator and/or a pinhole provided in the base.

For determining the vertical and horizontal collimation errors of the light beam in a first step an automatic process may be used in which the optical arrangement and the light beam are directed into nadir, that is downwardly oriented. The prism directs at least part of the passing light beam towards the collimator lens and the image sensor and/or pinhole. In this setup the alidade holding the optical arrangement is rotated around the vertical axis by 360° and the image of the light beam will describe a circle on the image sensor with the centre of the circle indicating the vertical axis. In addition two measurements are performed at a constant horizontal angle and different vertical angle of the optical arrangement. The light beam will correspondingly determine two points on the image sensor, both points defining a line therebetween. The foot dropped perpendicular from the circle center will be calculated, i.e. the minimum distance between the line and the center of the circle. The vertical angle at the foot print is given at exactly 200 gon because of pointing into nadir. The deviation equates to the vertical collimation error. The distance between circle center and the foot print defines the blind spot or the sum of instruments trunnion axis and horizontal collimation error. In case the trunnion error is known the horizontal collimation error can be calculated.

In a second step the collimator is used to quantify the trunnion axis error of the surveying instrument in an auto-collimation mould. A similar procedure as in the first step is used with the difference that the collimator is used in an auto-collimator function in which a measurement beam is directed through the collimator lens and through the prism in the optical channel against a mirror provided inside the optical arrangement, directing it back through the collimator lens. The measurement beam may be emitted by way of illuminating the pinhole and directing the measurement beam passing through the pinhole towards the collimator lens by use of a prism.

The optical arrangement is rotated in vertical direction as long as the image sensor can image the reflection from the pinhole reflected by the mirror, i.e. the measurement beam.

Subsequently a measurement as in step one is performed, that is with at least one complete turnaround in horizontal direction and with the light beam describing a circle on the image sensor. The center of the circle is measured as well as at least two points under different vertical angles. The circle center is again representing the vertical axis. The distance to the dropped perpendicular foot is measured, that is the minimum distance between the connecting line between the two points and the centre of the circle.

Subsequently the optical arrangement is switched around the trunnion axis into the face two orientation, that is exactly 180° and the same measurement procedure is repeated with the mirror illuminated from the backside. The second measurement will lead to a second circle with a centre coinciding with the centre of the first circle. However, the minimum distance between the line connecting the two additional measurement points and the centre of the circle will now be different from the first measurement. The mean value of the two distances is indicative of the trunnion axis error.

Accordingly, by the above self-calibration process the control values needed for compensating any deviation between the direction of the light beam and the optical axis can be determined.

The such obtained control values are stored in a memory as the desired calibration values.

The self-calibration may be carried out at suitable instances in time, e.g. in certain time intervals or if a change in environmental conditions is detected.

The mirror control unit 131 may obtain the such obtained control values as calibration values from the memory and apply them to the movable mirror during operation, for example upon start-up of the instrument 100. The mirror control unit may be realised at least partially in software and/or may be at least partially realised as a hardwired device.

The object 150 may be constituted by a marker in positioned in the field such as on a construction site at a position of interest. The object 150 may be a specifically designed object with reflective characteristics. However, the object may also be any location or part of an object present in a scene, such as a wall or edge of a building or a position on a road surface.

The embodiment described with respect to FIG. 1 is advantageous over surveying instruments with fixed mirrors in that an orientation and/or position of the movable mirror can be suitably adjusted before or during operation of the surveying instrument. This avoids the need in the prior art to accurately position and calibrate a fixed mirror so that a light beam for distance measurement is properly directed to an optical arrangement or in parallel thereto towards the desired object, which positioning and calibration is costly. Instead, control values may be used to properly adjust the movable mirror in accordance with the invention. A required accuracy during mounting the movable mirror can be reduced. Moreover, during the lifetime of a surveying instrument the individual components of the instrument may become misaligned, including a mirror for the distance measurement. In accordance with the invention such misalignments over the life-cycle of the instrument can be compensated by readjustment of the calibration values for controlling the movable mirror.

A further embodiment of the invention will now be described with respect to FIG. 2.

Figure 2:
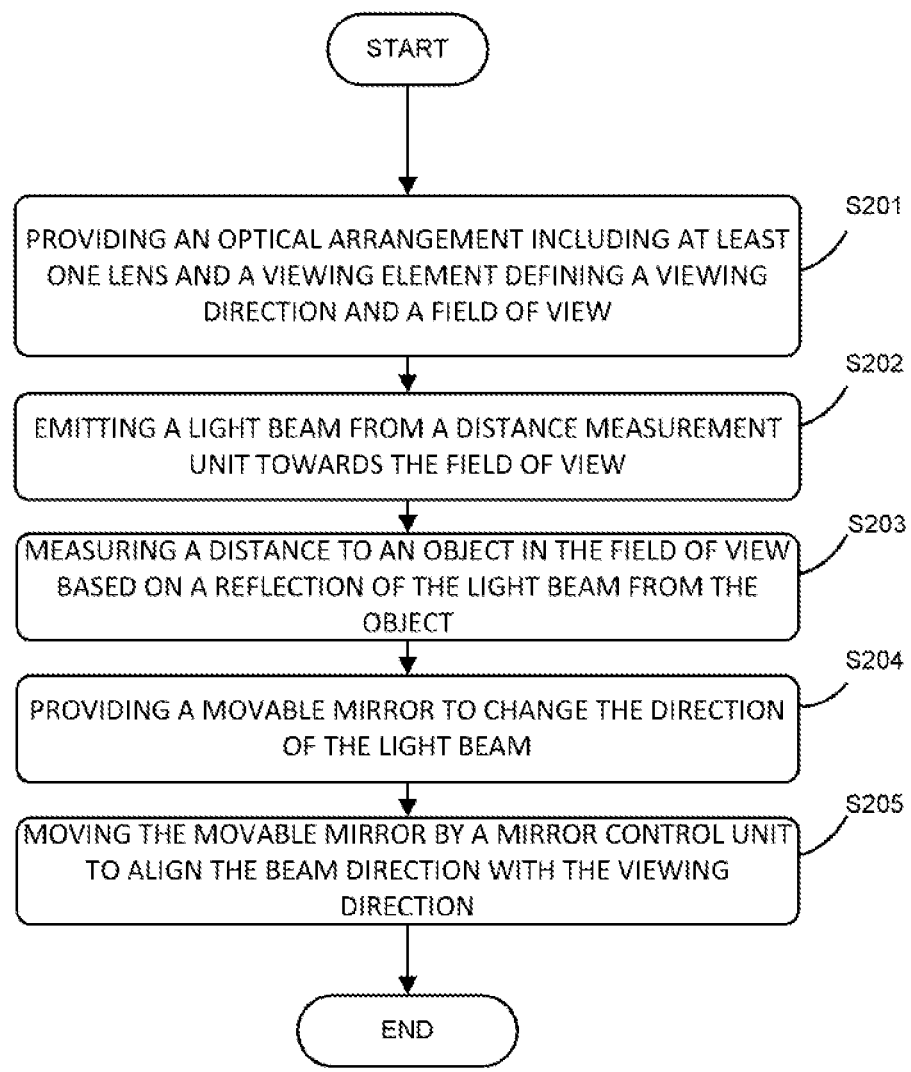
FIG. 2 illustrates a flow diagram of operations for aligning a direction of an emitted light beam with the viewing axis according to an embodiment of the invention.

FIG. 2 illustrates a flowchart with operations to operate an optical surveying instrument with a movable mirror. The operations of the figure may be carried out by the optical surveying instrument 100 shown in FIG. 1, however, FIG. 2 is not limited thereto.

In a first operation S201 and optical arrangement including at least one lens and the viewing element defining a viewing axis and the field of view is provided. The optical arrangement may be a telescope of the surveying instrument, such as a telescope of a theodolite. The surveying instrument may be suitably deployed on site for the designated task, such as for making measurements on a construction site, measuring distances to objects, tracking objects. The optical arrangement may be with fixed focus and/or aperture or variable focus and/or aperture for surveying an object in a scene present in the field of view of the optical arrangement.

In an operation S202 light beam is emitted from a distance measurement unit, such as the distance measurement unit 120 of FIG. 1, towards the field of view. In an operation S203 a distance to an object in the field of view is measured based on the reflector or backscattered light beam from the object.

For measuring the distance to the object the optical arrangement of the surveying instrument may be suitably directed towards the object by tilting the optical arrangement around vertical and horizontal axes. The distance measurement may be as known in the art based on a time of flight of the light beam from the surveying instrument to the object and back, which may involve processing phase difference between the emitted and reflected light beam.

In an operation S204 a movable mirror may be arranged to direct the light beam towards the object. The movable mirror may be a mirror that can be tilted and/or translated so that the light beam can be adjusted in different directions as needed, such as the movable mirror 130 shown in FIG. 1. For example, the movable mirror may be translated/tilted such that the light beam is aligned with the viewing axis such that an object in the centre of the field of view that is surveyed by the optical arrangement is precisely irradiated by the light beam. By using a movable mirror any inaccuracies that are device related or related to environmental conditions and may be compensated for by effecting a suitable rotation or translation of the movable mirror for adjusting the direction of the light beam.

For this purpose, in an operation S205 a mirror control unit, such as the mirror control unit 131 of FIG. 1, may be used for reading calibration values from a calibration value memory and for moving the movable mirror using the calibration values to adjust the direction of the light beam to be aligned with the viewing axis.

As the calibration values may be stored beforehand in the memory, they can be read, for example upon start-up of the surveying instrument, to readily adjust the emitted light beam in the right direction. Using calibration values advantageously avoids the need of potentially cumbersome and costly production steps for positioning a mirror for the light beam with high precision and low tolerance, as well as avoiding the need to mechanically adjust the position and direction of the mirror during operation for compensating for any misalignments that occur during operation of the surveying instrument, such as over time and due to environmental conditions.

The above described property of moving the movable mirror used to align the light beam with the viewing axis so that an object distance may be measured of an object that lies on the viewing axis of the optical arrangement may also be employed to adjust the light beam in directions that are intentionally not aligned with the viewing axis but deviated therefrom to positions in the field of view of the optical arrangement, for example for performing distance measurements to objects that are not positioned on the viewing axis. According to this modification the mirror control unit may be arranged to move the mirror to direct the light beam to one or a sequence of scan positions in the field of view and the like distance measurement unit may be arranged to measure the distance to objects located at these scan positions. For example, the motor control unit may adjust the movable mirror to direct the light beam to a first scan position in the field of view, and the distance measurement unit may perform a first distance measurement to an object located at this scan position. Subsequently, the motor control unit may adjust the movable mirror to direct the light beam to a second scan position in the field of view, and the distance measurement unit may perform a second distance measurement to an object located at the second scan position. Measuring distances to a plurality of scan positions may for example be employed for determining the shape of a larger object, such as a building or may be employed to generate a 3D map of a scene. For this purpose a known position of the surveying instrument, the angular orientation of the optical arrangement and the measured distance is used to locate the scan position in three dimensions. Multiple such located scan positions in three dimensions may then be combined to a three-dimensional map and/or for generating a three-dimensional visual representation on a display.

This provides a decisive advantage over prior art devices that usually scan distances to a plurality of scan positions by sequentially directing the optical arrangement and its viewing axis together with a light beam for distance measurement sequentially to the desired scan positions and to measure the distances to objects in the path of the thus directed light beam. This generally is a time-consuming process as it requires a mechanical movement of the entire optical arrangement using control motors. According to the present embodiment it is possible to keep the direction of the optical arrangement instead fixed, while the movable mirror is employed to direct the light beam to the scan positions for distance measurement.

Figure 3:
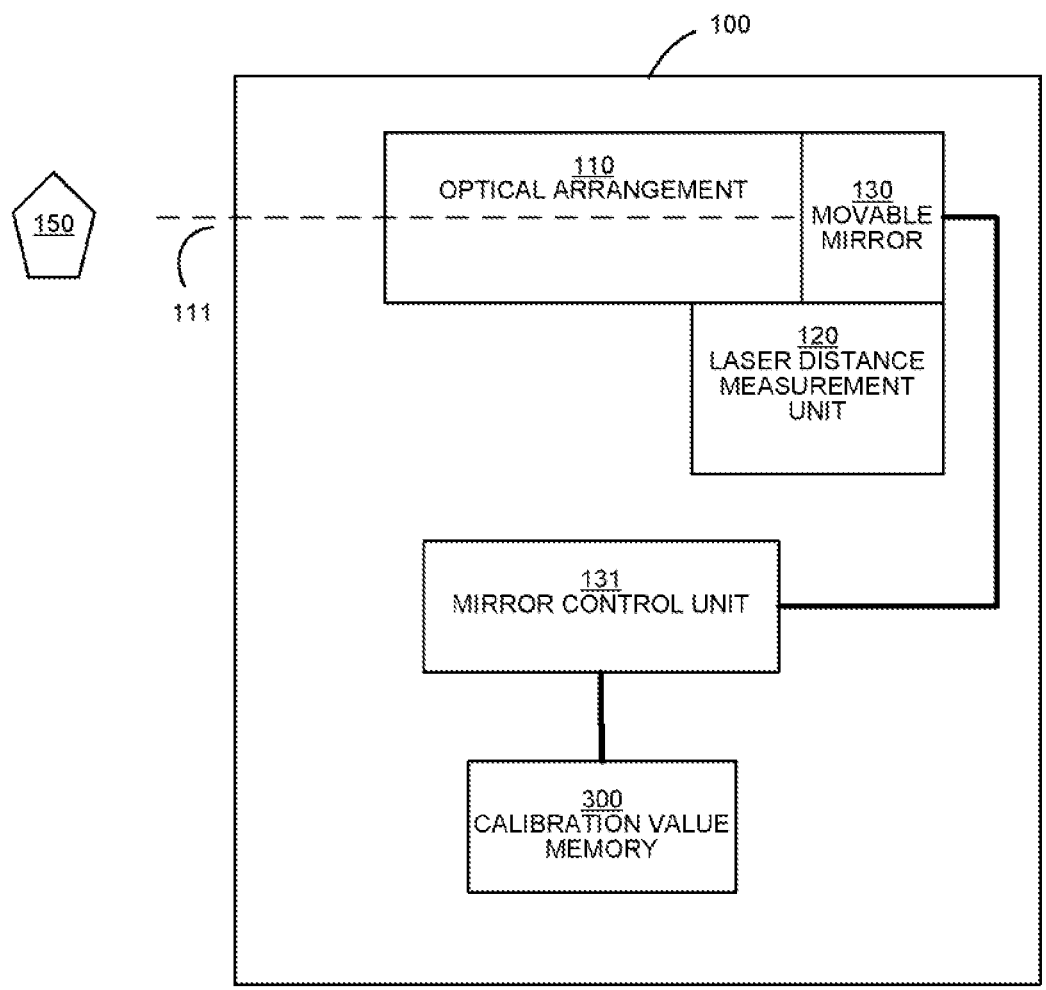
FIG. 3 illustrates an optical surveying instrument in accordance with an embodiment of the invention.

A further embodiment of the invention will be now described with respect to FIG. 3.

FIG. 3 illustrates a surveying instrument similar to the one shown in FIG. 1, most notably further illustrating a calibration value memory 300. The calibration value memory is provided for storing calibration values for the movable mirror that can be read by the mirror control unit 131 to suitably control the movable mirror 130 to be suitably directed, most importantly to be aligned with the viewing axis. The calibration value memory 300 may form an integral part of the surveying instrument 100, but also may be provided at least partially external to the surveying instrument 100, with communications carried out between the surveying instrument and a controller of the calibration value memory 300 for instructing a transfer of the calibration values to the surveying instrument 100.

Proper calibration values for controlling the movable mirror may be obtained in a calibration process in which the movable mirror is controlled by the mirror control unit 131 to align the laser beam with the viewing axis or another desired direction of the laser beam. When the laser beam is aligned with the viewing axis 111 or directed as otherwise desired, the calibration values can be determined. For example, control voltages of the movable mirror or other control values for controlling the movement of the movable mirror can be determined upon having achieved a desired position/rotation of the movable mirror and these values can then be stored as the calibration values in the calibration value memory 300.

The calibration process may be carried out from time to time as a regular routine or may be carried out upon detecting a misalignment of the laser beam with the viewing axis or other desired orientation of the laser beam, for example by a user or an automatic process.

During the calibration process the motor control unit may be manually controlled by an operator of the surveying instrument or may be operated in an automatic feedback process in which the direction of the laser beam is adjusted until for example a reflection of the laser beam from a suitably position object, such as an object lying on the viewing axis in the centre of the field of view of the optical arrangement, is received as required.

The calibration values may include one value for each adjustable parameter of the movable mirror, such as a first calibration for a rotation of the movable mirror around a first axis, a second calibration value for a rotation of the movable mirror around a second axis, and/or third calibration value for a translation of the movable mirror along a straight line. The first and second rotational axes may be perpendicular to one another.

Alternatively, the first to third calibration values may each depend on device parameters and/or environmental parameters so that for example multiple first calibration values are stored in dependence on a device parameter and/or environmental parameter. Likewise, multiple second and third calibration values may be stored in the calibration value memory.

The calibration value memory may therefore store the first to third calibration values in a multi-dimensional table, for example with the first to third calibration values in column direction and different values for the device or environmental parameter in row direction.

If multiple device and/or environmental parameters are defined, the table may have further dimensions or layers, for each added device and/or environmental parameter adding one dimension/layer.

Examples of the device parameters include at least one of a zoom setting of the optical arrangement, a focus setting of the optical arrangement, an aperture and similar.

Environmental parameters may include at least one of a temperature of the optical arrangement, a temperature of the mirror and an outside temperature.

For example, if a zoom position of the optical arrangement is defined as the device parameter and an outside temperature is defined as an environmental parameter, a value indicating the zoom setting may be obtained as well as a value of the outside temperature and the first to third calibration values may be obtained from the calibration value memory depending on the particular zoom setting and the outside temperature.

Accordingly, the alignment of the laser beam can be suitably adjusted based on the device and/or environmental parameters, providing improved operation under different device settings and environmental conditions.

A further embodiment of the invention will now be described with respect to FIGS. 4A and 4B.

Figure 4A:
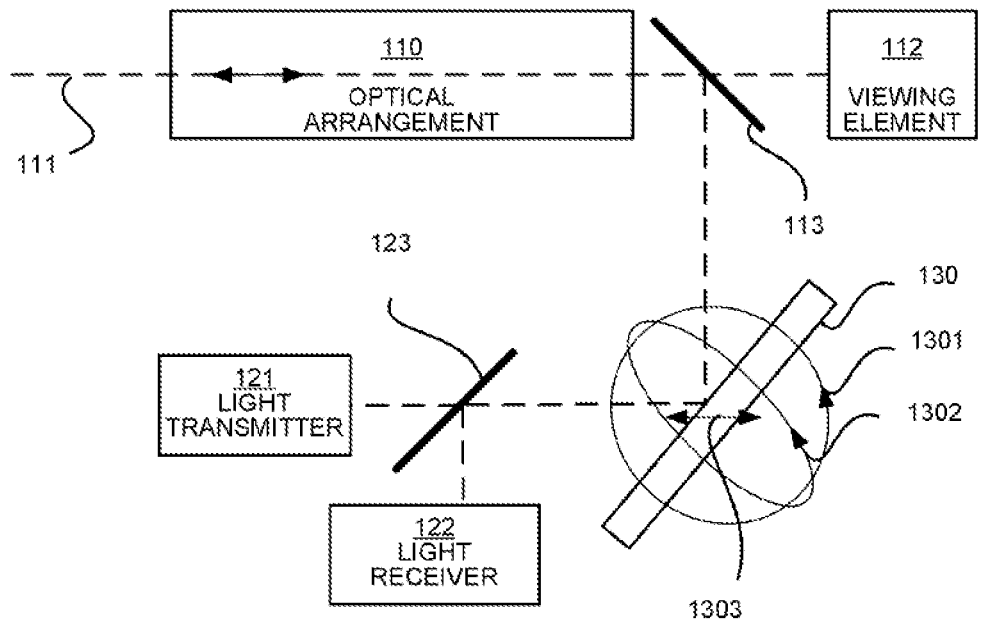
FIGS. 4A and 4B illustrate an optical surveying instrument in accordance with an embodiment of the invention with different states of alignment of an emitted light beam with the viewing axis of the instrument.

FIG. 4A illustrates an optical surveying instrument such as the optical surveying instrument shown in FIG. 1 in further detail.

FIG. 4A illustrates an optical arrangement 110 and a viewing element 112. A viewing axis 111 is defined by the optical arrangement and the viewing element. FIG. 4A further more illustrates a movable mirror 130 that can be rotated around a first axis as illustrated by an arrow 1301 and second axis as illustrated by an arrow 1302 as well as move forward and backward as indicated by an arrow 1303 in FIG. 4A. Preferably, the first and second axes are perpendicular to one another. A light transmitter 121 emits a light beam towards the mirror 130. The light beam thereby passes through a reflecting element 123, such as a beam splitter, coated element for selectively passing or reflecting light of specific wavelengths, e.g. the light beam emitted by the light transmitter 121, or the reflecting element 123 may be constituted by a mirror for reflecting light in certain areas of the mirror, such as a mirror with a wormhole. The movable mirror 130 reflects the light beam towards a further reflecting element 113 that reflects the light beam through the optical arrangement 110 towards a target in the field of view of the optical arrangement. The further reflecting element may also be a beam splitter or coated element for selectively passing or reflecting light of specific wavelengths, e.g. the light beam emitted by the light transmitter 121, or passing and reflecting light in specific areas, such as a mirror with a wormhole. The reflected light beam from the target is picked up by the optical arrangement 110 and, passing partially through the reflecting element 113 reaches the viewing element 112. The reflected part of the received light is directed by the reflecting element 113, the movable mirror 130, the first reflecting element 123 to a light receiver 122. For example, the distance to the target may be determined based on a time of flight/phase delay of the light beam emitted by the light transmitter 121, reflected by the target and received by the light receiver 122.

In FIG. 4A the light beam is illustrated as properly aligned with the viewing axis 111 of the optical arrangement, by suitable adjustment of the movable mirror 130. It is assumed that the first reflecting element 123 and the second reflecting element 113 are fixedly arranged in the optical surveying instrument.

If the light beam were misaligned with the viewing axis in FIG. 4A the rotation/translation of the movable mirror may be properly adjusted to realign the light beam with the viewing axis 111. For this purpose mainly the rotation of the mirror 130 would be adjusted around the rotational axes indicated by the arrows 1301 and 1302 to properly direct the light beam. However, for a desired focal position and/or a proper reflection of the light beam by the second mirror 113 it may be necessary to move the movable mirror 130 as indicated by the horizontal arrow 1303 in FIG. 4A.

Figure 4B:
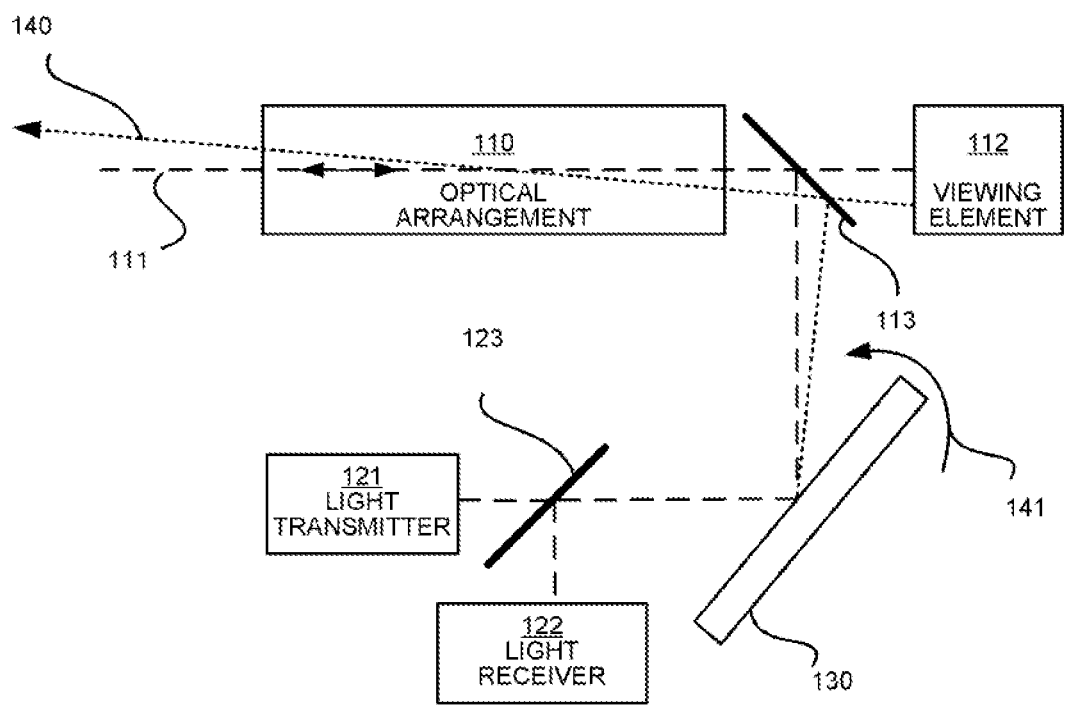

FIG. 4B illustrates an example of a misalignment of the light beam with the viewing axis. The surveying instrument of FIG. 4B substantially corresponds to the one of FIG. 4A, however, with the mirror 130 slightly deviating from the desired position so that the light beam transmitted by the light transmitter 121 is misaligned with the viewing axis 111 as illustrated by the dotted line 140. Accordingly, in order to compensate for this misalignment, the movable mirror 130 is rotated in a counterclockwise direction, as illustrated by the arrow 141 in FIG. 4B. The control value to the fact that the further adjustment of the movable mirror 130 may be stored as new calibration value in the calibration value memory.

FIG. 4B merely shows for illustration purposes one possibility of a misalignment of the light beam with the viewing axis, as it will be readily appreciated.

The embodiment described with respect to FIG. 4 illustrates how the movable mirror 130 can be advantageously adjusted by rotation and/or translation to properly direct the light beam emitted by the light transmitter 121 to be aligned with the viewing axis 111 of the instrument.

A further embodiment of the invention will now be described with respect to FIG. 5.

Figure 5:
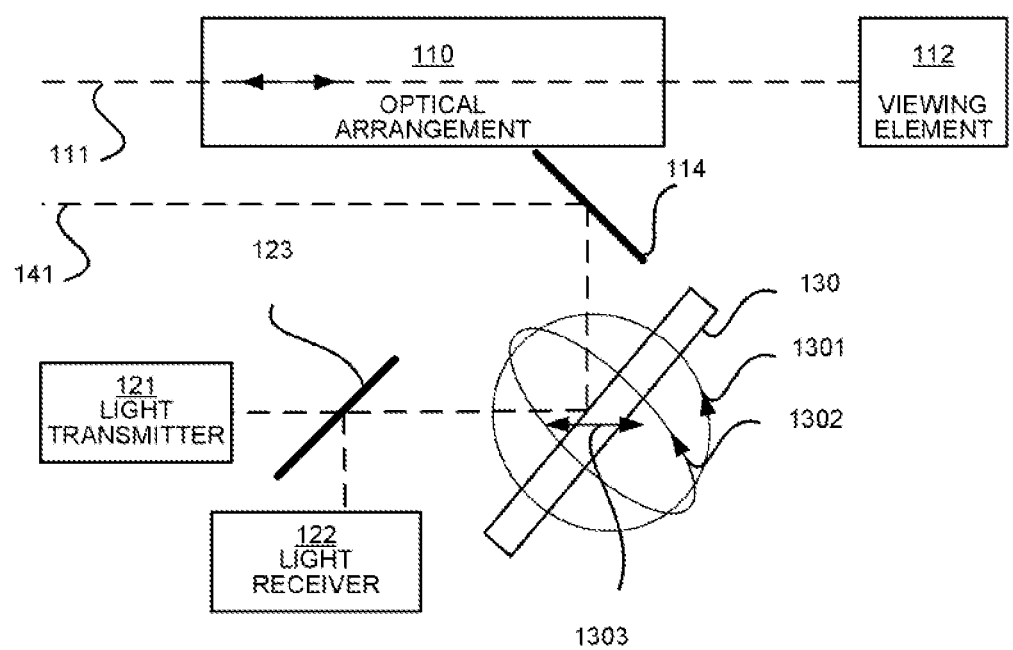
FIG. 5 illustrates an optical surveying instrument in accordance with an embodiment of the invention for illustrating the movement of the mirror.

FIG. 5 illustrates a surveying instrument that differs from the surveying instrument shown in the preceding embodiments in that the light beam emitted by the light transmitter 121 and reflected by the movable mirror 130 is aligned to be parallel to the viewing axis 111 of the previous embodiments.

In the preceding embodiments the light beam emitted by the light transmitter 121, for example, is reflected by the reflecting element 113 so that the light beam is aligned and coincides with the viewing axis 111 and thus passes through the optical arrangement 110. In the embodiment of FIG. 5 the mirror 113 is replaced by a mirror 114 not centred on the viewing axis 111 but being arranged neighbouring the optical arrangement 110 and reflecting the light beam from the light transmitter 121 to be in a parallel alignment with the viewing axis 111 and therefore does not pass through the optical arrangement 110. The path of the light beam in the embodiment of FIG. 5 is illustrated by the intermittent line illustrated at reference numeral 141. In the embodiment of FIG. 5 the light beam reflected by the target is received by the light receiver 122, as in the preceding embodiments. Apart from this difference in the path of the light beam to the previous embodiments, the operation is similar, in particular in view of the adjustment of the movable mirror 130. The movable mirror 130 in the embodiment of FIG. 5 is suitably adjusted such that the light beam emitted by the light transmitter as illustrated at reference numeral 141 is precisely aligned to be parallel with the viewing axis as illustrated at reference numeral 111 by rotation around the first and second axes indicated by reference numerals 1301 and 1302 and/or by a translational movement is indicated by the arrow 1303.

As the light beam does not pass through the optical arrangement, but in parallel thereto or through a further optical arrangement dedicated to the light beam emitted by the light transmitter 121, a simpler and cost saving structure of the surveying instrument can be realised.

Figure 6:
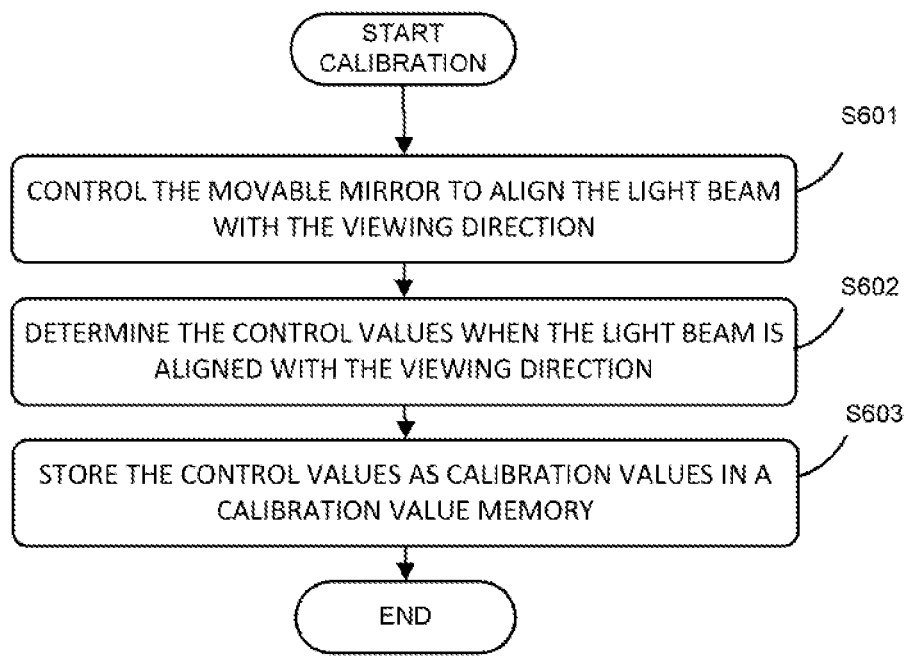
FIG. 6 illustrates a flow diagram of operations according to an embodiment of the invention for obtaining control values of the mirror.

A further embodiment of the invention will now be described with respect to FIG. 6. FIG. 6 illustrates operations to obtain calibration values for controlling the movable mirror such as the movable mirror 130 shown in the preceding embodiments.

In an operation S601 the movable mirror is controlled such that the light beam is aligned with the viewing axis. The alignment may be such that the light beam passes through the centre of the optical arrangement 110 along the viewing axis that may be considered to constitute the optical axis of the optical arrangement. Corresponding embodiments are shown for example with respect to FIGS. 1-4.

Alternatively, the alignment may involve controlling the movable mirror 130 such that the alignment involves aligning the light beam to be parallel with the viewing axis defined by the optical arrangement 110. A corresponding embodiment of the alignment of the light beam in parallel to the viewing axis is shown in FIG. 5.

In an operation S602 the control values of the movable mirror 130 are determined in the state were the light beam is aligned with the viewing axis as described with respect to step As 601. The determination of the control values may include obtaining from the motor control unit the control values to control the movement of the movable mirror such that the movable mirror is in a position where the light beam is suitably aligned with the viewing axis.

In an operation S603 the thus obtained control values are stored as calibration values in the calibration value memory such as outlined with respect to the previous embodiments. By storing the calibration values in a calibration value memory they can be suitably accessed for example if the surveying instrument is started up by a user and the movable mirror can be positioned using the calibration values such that the light beam is suitably aligned with the viewing axis.

Accordingly, any deviations of the components of the surveying instrument from their correct positions, such as due to production tolerances can be compensated for without a user of the surveying instrument having to take action or even noticing the calibration process upon start-up of the instrument.

Figure 7:
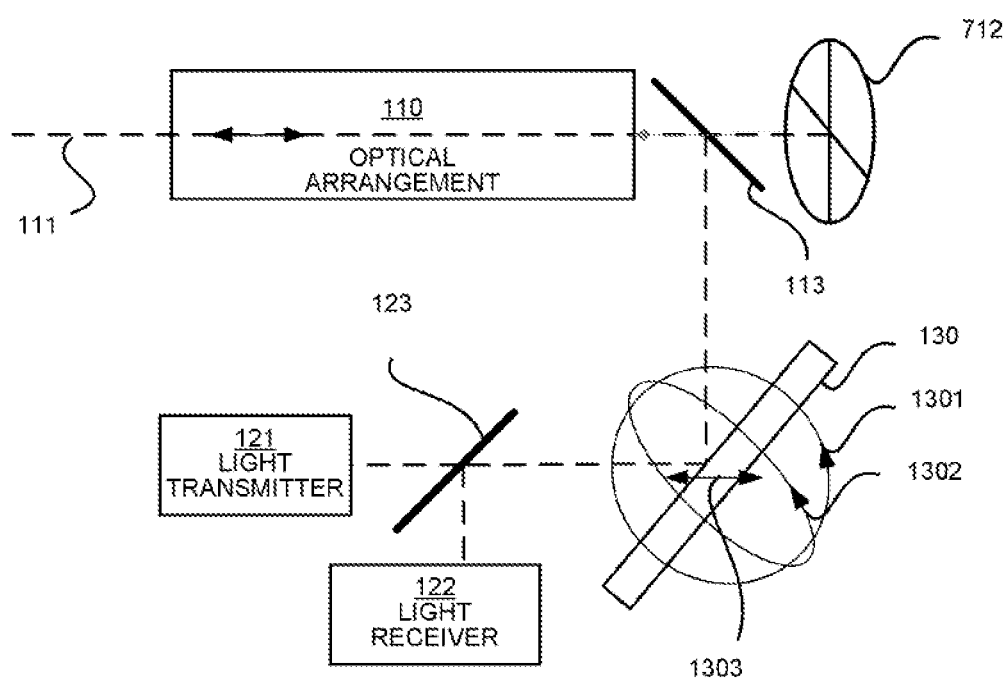
FIG. 7 illustrates an optical surveying instrument in accordance with an embodiment of the invention provided with an eyepiece including a crosshair.

In the following a further embodiment of the invention will be described with respect to FIG. 7. FIG. 7 illustrates an embodiment of the surveying instrument that is similar to the one described with respect to FIGS. 1-4.

In FIG. 7 the viewing element is constituted by and eyepiece 712 with a crosshair. The eyepiece 712 may be an optical element to be viewed by a user.

In the embodiment of FIG. 7 the viewing axis 111 can be defined by e.g. a centreline through the optical arrangement 110 and the crosshair of the viewing element 712. The viewing axis will thus be the connecting line between the crosshair and an object in the centre of the field of view, if a user looks through the viewing element 712.

If in the embodiment of FIG. 7 the light beam emitted by the light transmitter 121 is aligned with the viewing axis 111, back scattered light of the light beam irradiating the target in the field of view, such as target 150 of FIG. 1, passes through the mirror 113 onto the crosshair of the viewing element 712.

Accordingly, if the light beam is misaligned with the viewing axis 111 of the optical arrangement, such as shown in FIG. 4B, the reflected light beam will not pass through the crosshair of the viewing element 712 but will be offset therefrom. Accordingly, the control values for calibration of the movable mirror 130 need to be adjusted such that the reflected light beam passes precisely through the crosshair of the viewing element 712, such as by a user calibrating the surveying instrument. If the reflected light beam passes through the crosshair of the viewing element 712, the corresponding control values of the movable mirror 130 may be stored in the calibration value memory as the calibration value memory such as shown in the preceding embodiments.

The alignment may be carried out by the alignment process using a specific target or collimator as outlined above.

The embodiment of FIG. 7 allows to calibrate the surveying instrument with the simple steps for an initial calibration during manufacturing the surveying instrument or during operation as needed.

Below a further embodiment of the invention is described with respect to FIG. 8.

Figure 8:
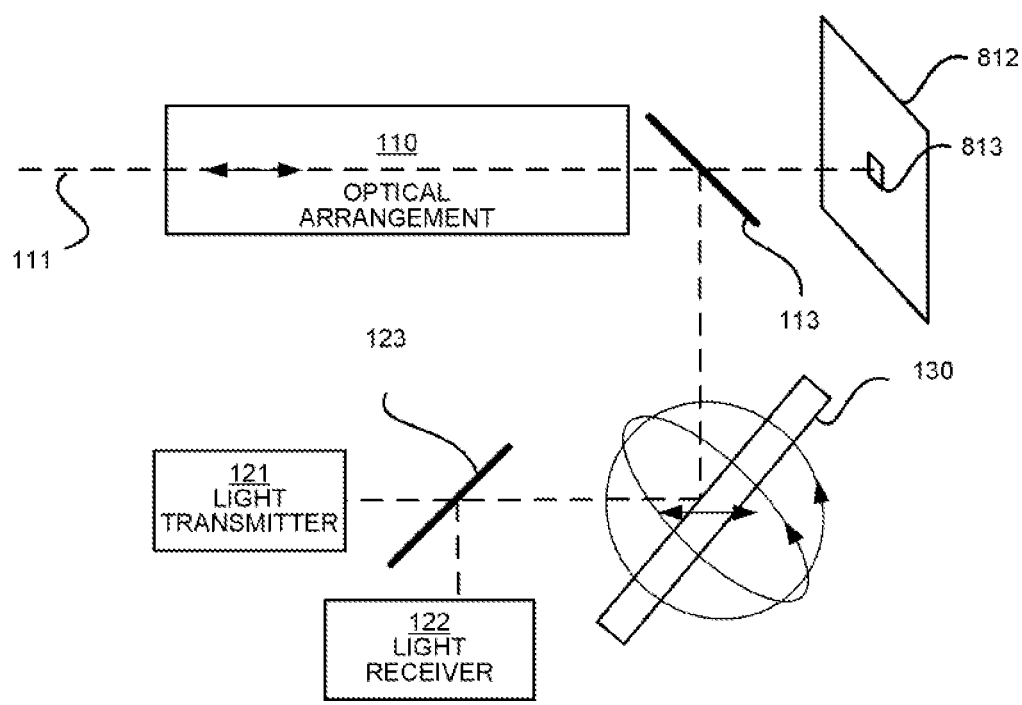
FIG. 8 illustrates an optical surveying instrument in accordance with an embodiment of the invention provided with an image sensor for imaging a scene captured by the surveying instrument.

FIG. 8 illustrates an embodiment similar to the one of FIG. 7 where the viewing element is constituted by an image sensor 812 instead of an eye piece 712 with a crosshair of FIG. 7.

The image sensor is substantially centred on the viewing axis 111 of the optical arrangement and arranged to acquire an image of the scene through the optical arrangement 110. Moreover, the image sensor acquires an image of the laser beam reflected by the viewed object. Accordingly, the reflected or back scattered light beam from the viewed object irradiates the image sensor 812 at a position 813. The position 813 on the image sensor may be a centre pixel or a pixel close to the centre of the image sensor 812 and be the position of the image of the reflected light beam, such as the crosshair of the viewing element 712 as illustrated with the preceding embodiment of FIG. 7. Accordingly, if a view object lies on the viewing axis 111 of the optical arrangement 110, the image of the object as well as the image of the reflected light beam appears on the image sensor at the position 813.

If the position 813 is defined at the centre close to the centre of the image sensor 812 the image of the reflected light beam will irradiate exactly this position 813, if the surveying instrument is constructed with highest precision. However, due to production tolerances it may be the case that the image of the light beam appears with an offset from the position 813 on the image sensor 812. In this case the movable mirror 130 is rotated and/or translated suitably to precisely adjust the reflected light beam so that it comes to lie on the desired position 813. The adjustment may be performed as outlined earlier by suitably setting the control values of the movable mirror 130. The adjustment may be an automatic process or the effected by a user calibrating a surveying instrument during production or during operation. The control values needed to correspondingly adjust the image of the light beam to the position 813 may then be stored as calibration values in the calibration value memory shown and described with respect to the previous embodiments.

As it becomes evident with the above, essentially an arbitrary pixel of the image sensor 812 can be defined as the desired position 813 of the image of the reflected light beam, and the movable mirror can be adjusted such that the reflected light beam indeed irradiates the image sensor 812 at the defined position 813.

This property of the present embodiment allows to advantageously compensate for errors generated by a misalignment of the optical arrangement, in particular the trunnion axis error, the horizontal collimation axis error and the vertical collimation axis error of the optical surveying instrument.

More precisely, the misalignments of the horizontal and vertical axes of the surveying instrument, as known in the art, lead to a trunnion axis error as well as a vertical collimation axis error and a horizontal collimation axis error. The embodiment described with respect to FIG. 8 allows a compensation for the trunnion axis error and the collimation axis error by suitably selecting the pixel 813 on the image sensor 812.

In this respect each of the trunnion axis error, the horizontal collimation axis error and the vertical collimation axis error each lead to a displacement of the image of the reflected light beam from the position 813. If for example the position 813 is defined with the horizontal angle and the vertical angle each being zero, the deviation of the image of the reflected light beam on the image sensor 812 from the initial position 813 progresses with increasing horizontal and vertical angles. The deviation may for example be expressed as x-coordinate and y-coordinate directional deviations of the reflection of the light beam from a centre position of the image sensor 812. Accordingly, if the axes errors are each known, the position 813 to which the reflection of the light beam needs to be directed by adjustment of the direction of the optical arrangement of the optical surveying instrument when aiming at an object can be suitably defined based on the axes errors.

The axis errors of the surveying instrument may be determined such as by measurements in the two faces, as known in the art, of the optical surveying instrument. The first internal configuration, also termed the first face of the surveying instrument, corresponds to a first rotational position of the optical arrangement around the viewing axis and the second face of the surveying instrument corresponds to a second internal configuration corresponding to a second rotational position of the optical arrangement around the viewing axis.

In the present embodiment, in order to obtain the axis errors of the surveying instrument, a first image of the light beam reflected from an object on the image sensor may be obtained with a first internal configuration of the surveying instrument. Then a second image of the light beam reflected from the object on the image sensor may be obtained with a second internal configuration of the surveying instrument and the centre position of the image sensor as a middle position between the first image and the second image of the light beam on the image sensor may be determined. Based thereon the effects of the trunnion axis error and the horizontal and vertical collimation axes errors can be determined based on the distance between the first image and the second image of the reflected light beam on the image sensor.

The viewing axis of the optical arrangement, once the axis errors and the corresponding deviation of the image of the reflected light beam from an initial position are determined, may therefore suitably be defined by using this moving target position of the reflection of the light beam on the image sensor 812 depending on the trunnion axis angle and the collimation axis angle.

Accordingly, the viewing axis defined by the optical arrangement and the viewing element is no longer fixed as in the embodiment described with respect to FIG. 7, were the position of the crosshair of the eyepiece 712 is invariant, but the viewing axis can be adapted to compensate for the trunnion axis error and the collimation axes errors.

To detect the position of the reflection of the light beam on the image sensor image processing techniques may be employed, for example for detecting a bright spot affected by the reflection of the light beam or a certain wavelength of the light beam on the image sensor.

The positional deviations of the image of the reflected light beam based on the axis errors may be stored in dependence on the individual rotational angles of the viewing element around the trunnion axis, the horizontal collimation axis and the vertical collimation axis. During operation the store deviations can be read out based on the present trunnion angle and collimation angles and the target position 813 on the image sensor 812 can be correspondingly defined when aiming at an object.

This adaptation of the position 813 on the image sensor 812 and thus of the viewing axis for compensation of the angle errors of the surveying instrument improves the handling of the surveying instrument.

Most notably, the embodiment makes it possible to aim at the zenith, that is vertically above the surveying instrument, a direction that is normally not accessible if the trunnion axis error is not zero.

Figure 9:
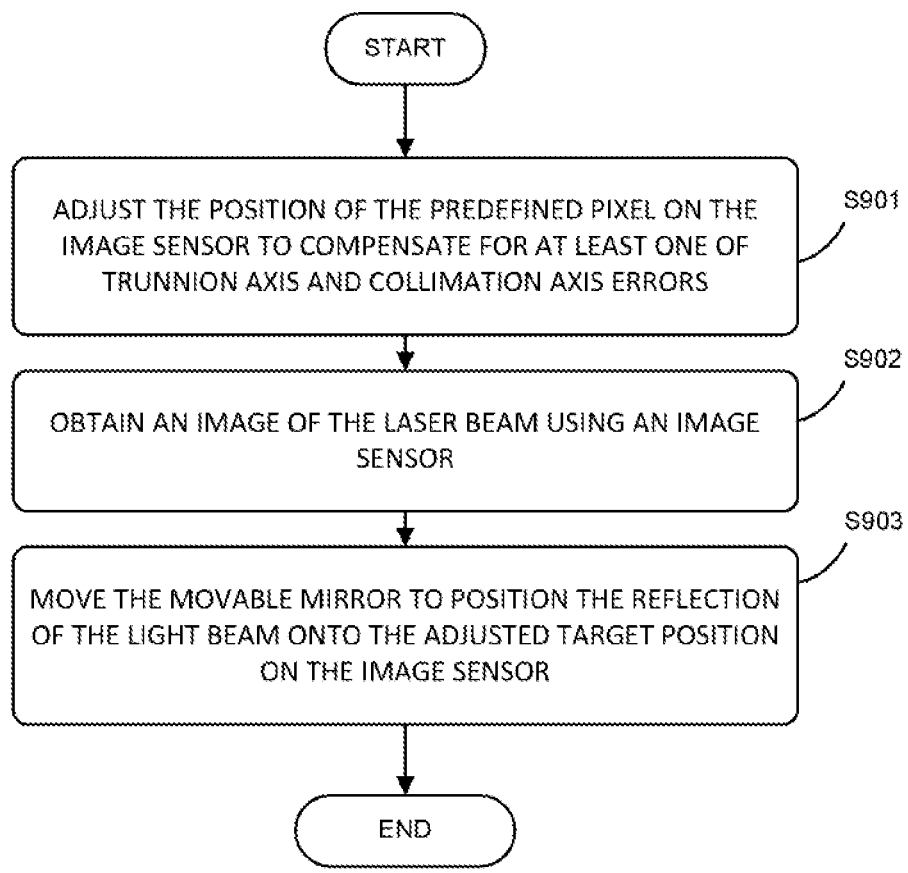
FIG. 9 illustrates operations according to an embodiment of the invention for compensating axis errors of the instrument.

A further embodiment of the invention is now described with respect to FIG. 9. FIG. 9 illustrates operations carried out for calibrating the surveying instrument as for example described with respect to FIG. 8, however, FIG. 9 is not limited thereto.

In a first operation S901 the target position 813 on the image sensor 812 is adjusted to compensate for at least one of the trunnion axis error, the horizontal collimation axis error and the vertical collimation axis error. The errors and the corresponding deviation of the image of the laser beam from the ideal centre position of the image sensor may be determined as described above.

In an operation S902 an image of the laser beam on the image sensor is obtained. In an ideal case the image of the laser beam corresponds to the target position on the image sensor 812 that has been determined in the previous step. However, in the real world due to device tolerances or environmental conditions the image of the laser beam deviates from the target position and its position needs to be adjusted.

Accordingly, in an operation S903 the movable mirror is moved so that the reflection of the light beam on the image sensor is moved onto the determined target position 813 on the image sensor, generally as described with respect to the previous embodiments.

The present embodiment allows a combination of an adjusted target position of the reflected light beam with a calibration using the calibration values for moving the movable mirror to align the light beam with the viewing axis, as described with respect to the previous embodiments.

Figure 10:
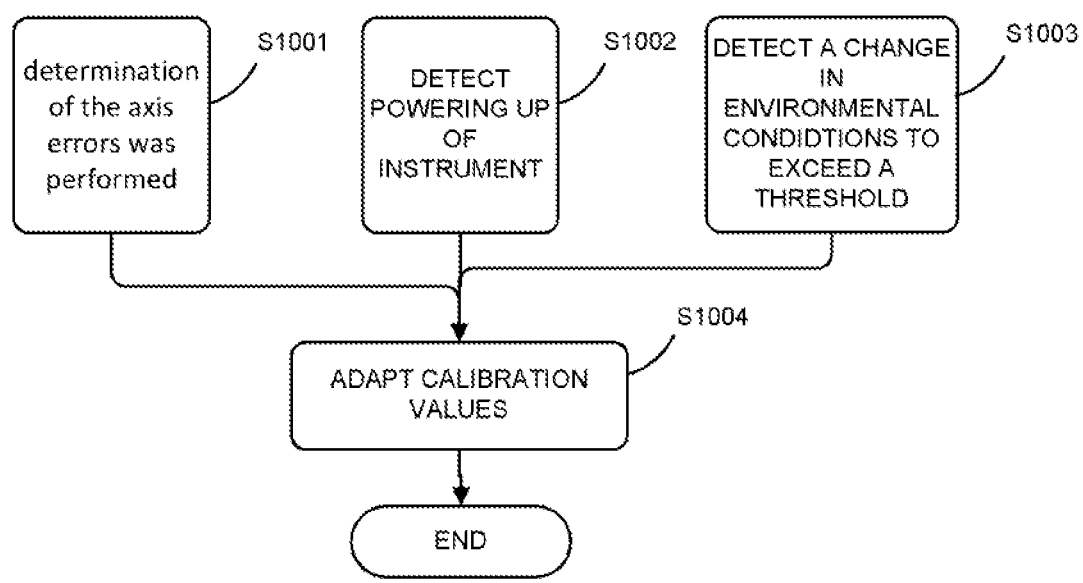
FIG. 10 illustrates operations for triggering the adaptation of the calibration values in accordance with an embodiment of the invention.

Below a further embodiment of the invention is described with respect to FIG. 10. FIG. 10 illustrates operations that may be carried out to adapt the calibration values in the calibration value memory such as described with respect to the preceding embodiments.

As noted before, the calibration values are adapted by aligning the light beam for performing the distance measurements with the viewing axis. Preferably, the light distance may be carried out during production of the surveying instrument, for example for an initial calibration of the instrument for generating an initial set of calibration values that are stored in the calibration value memory. Accordingly, during operation the calibration values may be read from the calibration value memory and used to adjust the orientation and/or position of the movable mirror to properly direct the light beam towards the object in the field of view.

It is, however, possible that during the lifetime or during certain environmental conditions the surveying instrument loses precision as the reflection of the light beam no longer is received on the intended position, such as the crosshair described with respect to FIG. 7 or the target position 813 described with respect to FIG. 8. If this happens, the surveying instrument needs to be recalibrated and the calibration values in the calibration value memory need to be updated. Generally, the calibration values can be updated by re-performing the alignment steps for aligning the light beam with the viewing axis as described with respect to the preceding embodiments and by storing the correspondingly needed control values for the movable mirror as updated calibration values.

Advantageously, as illustrated in operation S1001, the calibration values may be updated in operation S1004 upon a determination of the axes errors as outlined before. For example, upon determining the access errors of the surveying instrument and by correspondingly adjusting the target position 813 on the imaging sensor 812, as described with respect to FIG. 8, the calibration values may be updated by the above procedure.

Further, as described by operation S1002 a realignment of the light beam with the viewing axis may be performed and the calibration values be adapted in operation S1004 and the corresponding updated calibration values be stored upon a powering up of the surveying instrument, either each time or after a predetermined number of systems starts.

Still further, as described by operation S1003 the calibration values may be adapted in an operation S1004 upon detecting a change in the environmental conditions, such as if the parameters used for measuring the environmental conditions exceed eight predetermined threshold, such as the temperature inside the device, the outside temperature, and similar.

The embodiment described with respect to FIG. 10 advantageously allows a two keep the surveying instrument properly calibrated throughout its lifetime and/or upon varying environmental conditions.

While the above embodiments have been described individually, it is expressly noted that combinations and subcombinations of elements of the above embodiments are conceivable.

The invention claimed is:

1. Optical surveying instrument, comprising:
   an optical arrangement including at least one lens and a viewing element defining a viewing axis and a field of view, the viewing axis extending through a longitudinal center of the optical arrangement, wherein the viewing element includes an eyepiece for viewing a scene captured by the optical arrangement, or the viewing element includes a first image sensor for imaging the scene captured by the optical arrangement and the first image sensor is centered on the viewing axis;

a distance measurement unit configured to emit a light beam towards the field of view and to measure a distance to an object in the field of view based on a reflection of the light beam from the object;

a movable mirror arranged to direct the light beam towards the object and to receive the reflection of the light beam from the object; and a mirror control unit configured to:
  read calibration values from a calibration value memory, wherein the calibration values are used to control movement of the movable mirror to adjust a direction of the light beam to be aligned with the viewing axis, and
  move, before emitting the light beam towards the field of view, the movable mirror using the calibration values to adjust the direction of the light beam to be aligned with the viewing axis, wherein the light beam and the viewing axis are aligned when the light beam and the viewing axis coincide or when the light beam and the viewing axis are parallel to one another.

2. Optical surveying instrument according to claim 1, wherein the movable mirror is a microelectromechanical (MEMS) mirror and wherein movement of the mirror is controlled by the calibration values.

3. Optical surveying instrument according to claim 1, wherein the mirror control unit is configured to move the movable mirror by tilting it around a first tilting axis based on a first calibration value and by tilting it around a second tilting axis using a second calibration value.

4. Optical surveying instrument according to claim 3, wherein the mirror control unit is configured to move the movable mirror to adjust a focus of the light beam based on a third calibration value.

5. Optical surveying instrument according to claim 1, wherein the mirror control unit is configured to:
  control the movable mirror to align the light beam with the viewing axis;
  determine the calibration values when the light beam is aligned with the viewing axis; and
  store the calibration values in the calibration value memory.

6. Optical surveying instrument according to claim 1, the first image sensor is centered on the viewing axis to obtain an image of the light beam, wherein the mirror control unit is configured to move the light beam to position the image of the light beam at a target position of the first image sensor, and to store the calibration values in the calibration value memory.

7. Optical surveying instrument according to claim 6, wherein the target position of the first image sensor is defined based on at least one of a trunnion axis error, a vertical collimation axis error and a horizontal collimation axis error of the surveying instrument to compensate for the at least one error.

8. Optical surveying instrument according to claim 7, wherein the mirror control unit is configured to:
  obtain a first image of the light beam reflected from the object on the first image sensor with a first internal configuration of the optical surveying instrument;
  obtain a second image of the light beam reflected from the object on the first image sensor with a second internal configuration of the surveying instrument;
  obtain a center position of the first image sensor as a middle position between the first image and the second image of the light beam on the first image sensor; and
  calculate at least one of the trunnion axis error and the horizontal and vertical collimation axis errors based on a distance between the first image and the second image on the first image sensor.

9. Optical surveying instrument according to claim 7, further comprising:
  a collimator arrangement having at least one collimator lens and a second image sensor and/or a pinhole in a base unit of the optical surveying instrument for obtaining an image of the light beam on a second image sensor, and
  wherein the mirror control unit is configured to determine, based on the measurement image, at least one of the vertical, horizontal and trunnion axis errors of the surveying instrument and for determining corresponding calibration values for aligning the light beam with the viewing axis.

10. Optical surveying instrument according to claim 1, wherein the calibration value memory is for storing calibration values in dependence of at least one of device parameters and environmental parameters.

11. Optical surveying instrument according to claim 10, wherein the device parameters include at least one of a zoom setting, a focus, and an aperture of the optical arrangement.

12. Optical surveying instrument according to claim 10, wherein the environmental parameters include at least one of a temperature of the optical arrangement, a temperature of the movable mirror, and an outside temperature.

13. Optical surveying instrument according to claim 8, wherein the mirror control unit is configured to adapt the calibration values if at least one of the following conditions is fulfilled:
  the surveying instrument is powered up;
  determination of the axis errors was performed; and
  sensors of the surveying instrument detect a change in environmental conditions to exceed a threshold.

14. Optical surveying instrument according to claim 1, wherein the mirror control unit is configured to move the movable mirror to direct the light beam to a sequence of scan positions in the field of view and wherein the distance measurement unit is arranged to measure the distance to objects located at the scan positions.

15. Method for optical surveying, comprising:
  providing an optical arrangement including at least one lens and a viewing element for defining a viewing axis and a field of view, the viewing axis extending through a longitudinal center of the optical arrangement, wherein the viewing element includes an eyepiece for viewing a scene captured by the optical arrangement, or the viewing element includes a first image sensor for imaging the scene captured by the optical arrangement and the first image sensor is centered on the viewing axis;
  emitting from a distance measurement unit a light beam towards the field of view and measuring a distance to an object in the field of view based on a reflection of the light beam from the object;
  directing the light beam towards the object by adjusting an orientation of the movable mirror;
  receiving, by the movable mirror, the reflection of the light beam from the object;
  using a mirror control unit to read calibration values from a calibration value memory, wherein the calibration values are used to control movement of the movable mirror to adjust a direction of the light beam to be aligned with the viewing axis; and using the mirror control unit to move, before emitting the light beam towards the field of view, the movable mirror using the calibration values to adjust the direction of the light beam to be aligned (parallel to or coincide) with the viewing axis.

16. Method for optical surveying, comprising:

providing an optical arrangement including at least one lens and a viewing element for defining a viewing axis and a field of view, the viewing axis extending through a longitudinal center of the optical arrangement, wherein the viewing element includes an eyepiece for viewing a scene captured by the optical arrangement, or the viewing element includes a first image sensor for imaging the scene captured by the optical arrangement and the first image sensor is centered on the viewing axis;

emitting from a distance measurement unit a light beam towards the field of view and measuring a distance to an object in the field of view based on a reflection of the light beam from the object;

directing the light beam towards the object by adjusting an orientation of the movable mirror;

receiving, by the movable mirror, the reflection of the light beam from the object;

using a mirror control unit to read calibration values from a calibration value memory, wherein the calibration values are used to control movement of the movable mirror to adjust a direction of the light beam to be aligned with the viewing axis; and using the mirror control unit to move, before emitting the light beam towards the field of view, the movable mirror using the calibration values to adjust the direction of the light beam to be aligned (coincide with) the viewing axis.

* * * * *